United States Patent Office 2,743,258
Patented Apr. 24, 1956

2,743,258

RESINOUS, LINEAR POLYMERIC ALKANE-PHOSPHONATES

Harry W. Coover, Jr., Kingsport, Tenn., assignor to Eastman Kodak Company, Rochester, N. Y., a corporation of New Jersey No Drawing. Application September 10, 1952, Serial No. 308,925

5 Claims. (Cl. 260—49)

This invention relates to resinous, linear polymeric organophosphonates, and more particularly to polymeric alkanephosphonates, and to a process for their preparation.

I have made the important discovery that when alkanephosphonyl dichlorides are heated with certain dihydroxy aromatic compounds, in the presence of a condensation catalyst, hydrogen chloride is liberated in the ensuing reaction and high molecular weight linear polymers are formed which are resinous polyphosphonates comprising the recurring structural unit

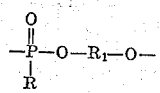

wherein R represents an alkyl group containing from 1 to 12 carbon atoms (e. g. methyl, ethyl, propyl, isopropyl, butyl, sec. butyl, decyl, dodecyl, etc. groups) and a cycloalkyl group (e. g. cyclopentyl or cyclohexyl groups), and $R_1$ represents an aromatic nucleus such as a benzene nucleus, a diphenyl nucleus, a diphenyl sulfone nucleus, a naphthalene nucleus, etc. The above defined resins are valuable materials for the preparation of fibers, films, coating compositions, molding compositions, and the like.

It is, accordingly, an object of the invention to provide a new class of resinous, linear polymeric alkanephosphonates. Another object is to provide a process for preparing such resinous products. Other objects will become apparent hereinafter.

In accordance with my invention, I prepare the new class of resins represented by the linearly recurring structural unit

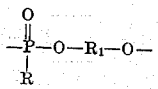

wherein R and $R_1$ have the previously defined meanings, by heating in the presence of an anhydrous alkaline-earth halide condensation catalyst (e. g. calcium chloride, zinc chloride, barium chloride, etc., but especially anhydrous magnesium chloride) a mixture comprising approximately equimolar proportions of a dihydroxy aromatic compound and an organo-phosphonic acid dichloride having the general formula:

wherein R has the previously defined meaning, at a temperature of from 90°–400° C., preferably from 150°–260° C., until the condensation reaction is substantially complete. The amount of catalyst can vary from about 0.1 to 3.0 per cent or even higher, based on the weight of the reactants. Mixtures in any proportions of one or more of the dihydroxy aromatic compounds with molecularly equivalent amounts of one or more of the organo-phosphonic acid dichlorides can be employed. Advantageously, the reaction temperature is gradually raised with stirring to approximately 200°–230° C., the hydrogen chloride that forms being, if desired, swept out with a dry inert gas such as dry nitrogen, and then vacuum is applied gradually while the temperature is raised further to a final temperature of 250° C. or more. This promotes completion of the reaction and ensures the rapid and substantially complete elimination of the evolved hydrogen chloride so that relatively pure polymeric products are obtained. Usually all of the quantities to be employed of the reactants and the catalyst are mixed together and the reaction performed as above described. However, good results are also obtainable by adding only part of the organo-phosphonic acid dichloride to the full amount of the dihydroxy aromatic compound and catalyst, and after the reaction has proceeded for some time at, for example, about from 90°–130° C., adding the remainder of the organo-phosphonic acid dichloride and continuing to heat with gradually increasing vacuum and temperature as above described, until the condensation reaction is substantially complete. In the process as described the condensation takes place in the proportion of one mole of the dihydroxy aromatic compound to each mole of the organo-phosphonic acid dichloride.

Suitable dihydroxy aromatic compounds which can be employed in the practice of my invention include resorcinol, catechol, hydroquinone, dihydroxytoluenes, dihydroxyxylenes, dihydroxydiphenyls such as p,p'-dihydroxydiphenyl, dihydroxydiphenylsulfones, etc. The alkanephosphonic acid dichlorides employed in the invention include methanephosphonyl dichloride, ethanephosphonyl dichloride, propanephosphonyl dichloride, isopropanephosphonyl dichloride, butanephosphonyl dichloride, sec. butanephosphonyl dichloride, heptanephosphonyl dichloride, decanephosphonyl dichloride, dodecanephosphonyl dichloride, cyclopentanephosphonyl dichloride, cyclohexanephosphonyl dichloride, and the like.

The following examples will serve further to illustrate my new polymeric alkanephosphonates and the manner of their preparation.

Example 1

A mixture of 5.5 g. (0.05 mole) of hydroquinone, 11.07 g. (0.051 mole) of heptanephosphonyl dichloride and 0.1 g. of anhydrous magnesium chloride was stirred slowly while the temperature was gradually raised to 205° C., over a period of 4 hours. Dry nitrogen was bubbled into the reaction mixture to help remove the hydrogen chloride that was formed and to facilitate the stirring. After the reaction mixture had become quite viscous (2–3 hours), the pressure was slowly reduced to 5.0 mm. and maintained there, while the stirring and heating were continued for 4 more hours. The final temperature was about 230° C. The polymeric material at this point was of such high viscosity that stirring was difficult. The light amber-colored polymeric material obtained at normal temperature was a tough, rubbery, flameproof material. It dissolved slowly in dimethylformamide forming a clear jelly-like mass.

In place of the heptanephosphonyl dichloride in the above example, there can be substituted an equivalent amount of any other of the mentioned alkane- or arylphosphonyl dichlorides, for example, benzenephosphonyl dichloride, benzylphosphonyl dichloride, dodecanephosphonyl dichloride, to give corresponding resinous materials of generally similar properties.

Example 2

A mixture of 0.05 mole of hydroquinone, 0.051 mole of methanephosphonyl dichloride and 0.1 g. of anhydrous magnesium chloride was stirred slowly while the temperature was gradually raised to 225° C. over a period of 4 hours. Dry nitrogen was bubbled into the reaction mixture to help remove the hydrogen chloride that was formed and to facilitate the stirring. After the reaction mixture had become quite viscous, the pressure was slowly reduced to 5 mm. and maintained while the stirring and heating were continued for 4 or more hours. The final temperature was about 230° C. The resultant polymer at normal temperature was a hard, tough, flameproof material. It was soluble in such solvents as dimethylformamide. The polymer was injection moldable to give hard, tough, noninflammable shaped objects.

Example 3

A mixture of 0.05 mole of resorcinol, 0.051 mole of cyclohexanephosphonyl dichloride and 0.1 g. of anhydrous magnesium chloride was stirred slowly while the temperature was raised to 205° C. over a 4 hour period. Dry nitrogen was bubbled into the reaction mixture to help remove the hydrogen chloride which formed and to facilitate the stirring. After the reaction mixture had become quite viscous, the pressure was slowly reduced to 1–2 mm. and maintained while stirring and heating were continued for an additional 3 hours. Final temperature was about 250° C. The polymeric material at this stage of the reaction had such a high viscosity that stirring was difficult. The light amber-colored polymer at room temperature was a hard, tough, flameproof material which could be injection molded or extruded into good quality, dyeable fibers.

Example 4

A mixture of 0.05 mole of hydroquinone, 0.05 mole of p,p'-dihydroxydiphenylsulfone, 1.11 mole of pentanephosphonyl dichloride and 0.2 g. of anhydrous magnesium chloride was stirred while the temperature was gradually raised to 205° C. over a period of 4 hours. Dry nitrogen was bubbled into the reaction mixture to remove the evolved hydrogen chloride and to facilitate the stirring. After the reaction mixture had become quite viscous, the pressure was slowly reduced to 1–2 mm. and maintained while stirring and heating were continued for an additional 4 hours. Final temperature was about 230° C. The light amber-colored polymer at room temperature was a hard, tough, flameproof material and could be readily extruded or injection molded. The polymer comprised in combination the recurring structural units

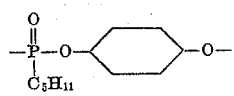

and

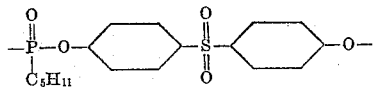

Example 5

A mixture of 0.05 mole of p,p'-dihydroxydiphenyl, 0.025 mole of heptanephosphonic acid dichloride, 0.026 mole of benzenephosphonic acid dichloride and 0.1 g. of anhydrous magnesium chloride was stirred while the temperature was gradually raised to 225° C. over a 3 hour period. Dry nitrogen was bubbled into the reaction mixture to help remove the hydrogen chloride that was formed and to facilitate the stirring. After the reaction became quite viscous, the pressure was slowly reduced to 5 mm. and maintained while the stirring and heating was continued for 4 hours longer. Final reaction temperature was approximately 240° C. The resultant polymer was a hard, tough, light amber-colored material which could be readily extruded or injection molded. The polymer comprised in combination the recurring structural units

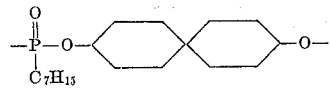

and

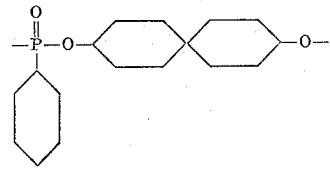

Example 6

A mixture of 11.0 g. (0.1 mole) of hydroquinone, 4.87 g. (0.025 mole) of benzenephosphonyl dichloride, 5.02 g. (0.025 mole) of cyclohexanephosphonyl dichloride and 0.1 g. of anhydrous magnesium chloride was stirred slowly while the temperature was raised gradually to 90° C. and maintained for one hour. Dry nitrogen was bubbled into the reaction mixture to help remove the hydrogen chloride that formed and to facilitate the stirring. Care was taken not to distill out any of the low molecular weight material or unreacted phosphonyl dichlorides. The temperature after 3 hours was 120° C. At this point 4.87 g. (0.025 mole) more of benzenephosphonyl dichloride and 5.23 g. (0.026 mole) more of cyclohexanephosphonyl dichloride were added. After the reaction mixture had again become viscous, the pressure was gradually reduced so that the hydrogen chloride might be removed more rapidly and completely. The vacuum was gradually increased until a pressure of 1–2 mm. and a temperature of 250° C. were obtained. After the evolution of hydrogen chloride had practically stopped (5–8 hours), a clear amber-colored product was obtained. At room temperature, it was a hard, tough, flameproof material. The polymer comprised in combination the recurring structural units:

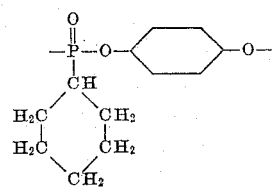

and

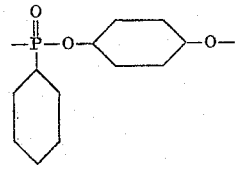

By proceeding as set forth in the preceding examples, other resinous, linear polymeric alkanephosphonates of the invention can be prepared. At their melting points, all of the resins above defined and illustrated form clear, viscous masses which can be readily injection molded or extruded into fibers, films, etc. having remarkable properties. In general, at ordinary temperatures they are hard, tough materials having softening points in the range of 100°–130° C., and are noninflammable. The higher molecular weight members are not readily soluble in common solvents; however, many of the polymeric products are readily soluble in such solvents as dimethylformamide, dimethylacetamide, etc., at room temperature. The lower molecular weight members are readily soluble in such solvents as acetone and ethylene chloride. Compositions of the polymeric products for extrusion, molding or coating purposes may have incorporated therein, if desired, various other materials such as fillers, dyes, sizing materials, and the like. Mixtures of the various polymers of the invention can be employed for the above purposes.

What I claim is:

1. A process for preparing a tough resinous, linear polymeric organophosphonate comprising in linear combination the recurring structural units

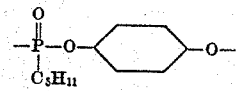

and

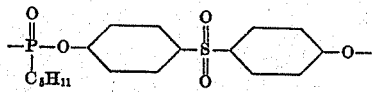

which comprises heating at a temperature of from 150°–260° C., in the presence of anhydrous magnesium chloride, a mixture consisting of hydroquinone and p,p-dihydroxydiphenylsulfone with a molecularly equivalent amount of pentane phosphonyl dichloride, until the said polymeric organo-phosphonate has formed.

2. A process for preparing a tough resinous, linear polymeric organo-phosphonate comprising the recurring structural unit

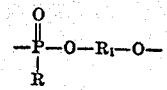

wherein R represents a member selected from the group consisting of an alkyl group containing from 1 to 12 carbon atoms and a cyclohexyl group, and $R_1$ represents an aromatic nucleus selected from the group consisting of a benzene nucleus, a diphenyl nucleus and a diphenyl sulfone nucleus, which comprises heating at a temperature of from 150°–260° C., in the presence of anhydrous magnesium chloride, a mixture consisting of equimolar quantities of (1) a dihydroxy aromatic compound selected from the group consisting of a dihydroxybenzene, a dihydroxydiphenyl and a dihydroxydiphenyl sulfone, and (2) an organo-phosphonic acid dichloride having the general formula:

wherein R has the above definition, until the said polymeric organo-phosphonate has formed.

3. A process for preparing a tough resinous, linear polymeric organo-phosphonate comprising the recurring structure unit

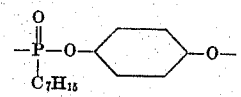

which comprises heating at a temperature of from 150°–260° C., in the presence of anhydrous magnesium chloride, a mixture consisting of approximately equimolar quantities of hydroquinone and heptanephosphonyl dichloride, until the said polymeric organo-phosphonate has formed.

4. A process for preparing a tough resinous, linear polymeric organo-phosphonate comprising the recurring structural unit

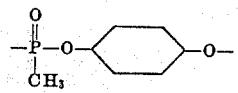

which comprises heating at a temperature of from 150°–260° C., in the presence of anhydrous magnesium chloride, a mixture consisting of approximately equimolar quantities of hydroquinone and methanephosphonyl dichloride, until the said polymeric organo-phosphonate has formed.

5. A process for preparing a tough resinous, linear polymeric organo-phosphonate comprising the recurring structural unit

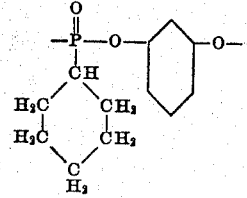

which comprises heating at a temperature of from 150°–260° C., in the presence of anhydrous magnesium chloride, a mixture consisting of approximately equimolar quantities of resorcinol and cyclohexanephosphonyl dichloride, until the said polymeric organo-phosphonate has formed.

References Cited in the file of this patent

UNITED STATES PATENTS

| | | |
|---|---|---|
| 2,435,252 | Toy | Feb. 3, 1948 |

FOREIGN PATENTS

| | | |
|---|---|---|
| 482,018 | Great Britain | Mar. 22, 1938 |
| 653,489 | Great Britain | May 16, 1951 |
| 282,638 | Switzerland | Sept. 1, 1952 |